(12) United States Patent
Miller et al.

(10) Patent No.: US 9,963,033 B2
(45) Date of Patent: May 8, 2018

(54) SYSTEM AND METHOD FOR ESTABLISHING ACOUSTIC METRICS TO DETECT DRIVER IMPAIRMENT

(75) Inventors: Thomas Lee Miller, Ann Arbor, MI (US); Scott Alan Watkins, Canton, MI (US); Brian Bennie, Sterling Heights, MI (US); Mark Edward Porter, South Lyon, MI (US); Brigitte Frances Mora Richardson, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 343 days.

(21) Appl. No.: 14/237,533

(22) PCT Filed: Aug. 9, 2012

(86) PCT No.: PCT/US2012/050099
§ 371 (c)(1),
(2), (4) Date: Feb. 6, 2014

(87) PCT Pub. No.: WO2013/023032
PCT Pub. Date: Feb. 14, 2013

(65) Prior Publication Data
US 2014/0231166 A1  Aug. 21, 2014

Related U.S. Application Data

(60) Provisional application No. 61/522,532, filed on Aug. 11, 2011.

(51) Int. Cl.
*B60K 28/06* (2006.01)
*B60K 28/02* (2006.01)
(Continued)

(52) U.S. Cl.
CPC .............. *B60K 28/06* (2013.01); *B60W 40/08* (2013.01); *G10L 15/00* (2013.01); *B60W 2040/0818* (2013.01); *B60W 2420/54* (2013.01)

(58) Field of Classification Search
CPC ........ B60K 28/00; B60K 28/02; B60K 28/06; B60K 28/063; B60K 28/066
See application file for complete search history.

(56) References Cited

U.S. PATENT DOCUMENTS 3,611,344 A * 10/1971 Couper .......................... 180/272
4,723,625 A    2/1988 Komlos
(Continued)

FOREIGN PATENT DOCUMENTS

CN         101386269 A      3/2009

OTHER PUBLICATIONS

International Search Report and Written Opinion for Application No. PCT/US12/50099, dated Oct. 16, 2012, 9 pages.
(Continued)

*Primary Examiner* — Barry Gooden, Jr.
(74) *Attorney, Agent, or Firm* — Jennifer M. Stec; Brooks Kushman P.C.

(57) ABSTRACT

An apparatus for detecting an impairment state of a driver in a vehicle is provided. The apparatus comprises a vehicle interface device configured to receive a first audible signal from a driver indicative of at least one word while the driver is in a non-impaired state and to determine a first total time to recite the at least the word based on the first audible signal. The vehicle interface device is further configured to command the driver to recite the at least one word to determine the impairment state of the driver and to receive a second audible signal from the driver indicative of the at least one word. The vehicle interface device is further
(Continued)

configured to determine a second total time to recite the at least one word based on the second audible signal and to compare the first total time to the second total time.

20 Claims, 11 Drawing Sheets

(51) Int. Cl.
*B60W 40/08* (2012.01)
*G10L 15/00* (2013.01)

(56) References Cited

U.S. PATENT DOCUMENTS

| | | | | |
|---|---|---|---|---|
| 6,748,301 | B1* | 6/2004 | Ryu | 701/1 |
| 6,748,792 | B1* | 6/2004 | Freund | B60K 28/063 |
| | | | | 180/272 |
| 9,073,430 | B1* | 7/2015 | Boss | B60K 28/06 |
| 9,475,387 | B2* | 10/2016 | Wu | B60K 28/06 |
| 9,758,173 | B1* | 9/2017 | Plummer | B60W 40/08 |
| 2002/0084130 | A1* | 7/2002 | Der Ghazarian et al. | 180/272 |
| 2002/0105438 | A1 | 8/2002 | Forbes et al. | |
| 2004/0162695 | A1* | 8/2004 | Tanaka | 702/127 |
| 2004/0243401 | A1* | 12/2004 | Shiomi et al. | 704/206 |
| 2005/0143884 | A1* | 6/2005 | Bihler et al. | 701/36 |
| 2006/0220915 | A1* | 10/2006 | Bauer | 340/945 |
| 2006/0237252 | A1* | 10/2006 | Mobley et al. | 180/272 |
| 2007/0120691 | A1* | 5/2007 | Braun | 340/576 |
| 2008/0291032 | A1* | 11/2008 | Prokhorov et al. | 340/576 |
| 2010/0030434 | A1 | 2/2010 | Okabe et al. | |
| 2010/0294583 | A1* | 11/2010 | Biondo et al. | 180/272 |
| 2011/0063099 | A1 | 3/2011 | Miller et al. | |
| 2011/0169624 | A1 | 7/2011 | Anschutz et al. | |
| 2011/0224875 | A1* | 9/2011 | Cuddihy et al. | 701/42 |
| 2011/0264325 | A1* | 10/2011 | McLaughlin | B60T 8/172 |
| | | | | 701/33.4 |
| 2012/0023049 | A1* | 1/2012 | Doerr et al. | 706/20 |
| 2012/0200414 | A1* | 8/2012 | White et al. | 340/575 |
| 2012/0212353 | A1* | 8/2012 | Fung et al. | 340/905 |
| 2012/0286957 | A1* | 11/2012 | Frechette et al. | 340/575 |
| 2013/0044000 | A1* | 2/2013 | Nakai et al. | 340/575 |
| 2014/0088840 | A1* | 3/2014 | Baumgarten et al. | 701/50 |
| 2014/0218187 | A1* | 8/2014 | Chun et al. | 340/439 |
| 2014/0225725 | A1* | 8/2014 | Takahashi et al. | 340/439 |
| 2014/0297111 | A1* | 10/2014 | Takahashi | 701/36 |
| 2014/0300478 | A1* | 10/2014 | Kume et al. | 340/576 |
| 2014/0329513 | A1* | 11/2014 | Jacob | 455/418 |
| 2014/0377877 | A1* | 12/2014 | Burgi et al. | 436/120 |
| 2015/0165903 | A1* | 6/2015 | Williams | B60K 28/063 |
| | | | | 701/36 |
| 2016/0001781 | A1* | 1/2016 | Fung | G06F 19/345 |
| | | | | 701/36 |
| 2016/0246298 | A1* | 8/2016 | Sato | B60Q 9/00 |
| 2017/0028987 | A1* | 2/2017 | Yamada | B60W 50/08 |
| 2017/0096145 | A1* | 4/2017 | Bahn | E05F 15/70 |

OTHER PUBLICATIONS

International Preliminary Report for Application No. PCT/US12/50099, dated Dec. 5, 2013, 8 pages.

Chinese Office Action for corresponding Application No. 201280050225.7, dated Jul. 27, 2015, 11 pages.

* cited by examiner

SYSTEM AND METHOD FOR ESTABLISHING ACOUSTIC METRICS TO DETECT DRIVER IMPAIRMENT

CROSS-REFERENCE TO RELATED APPLICATION

This application is the U.S. national phase of PCT Application No. PCT/US2012/050099 filed on Aug. 9, 2012, which claims the benefit of U.S. provisional application Ser. No. 61/522,532 filed on Aug. 11, 2011, the disclosures of which are incorporated in their entirety by reference herein.

TECHNICAL FIELD

Embodiments as set forth herein generally related to a system and method for establishing acoustic metrics to detect driver impairment.

BACKGROUND

Alcohol monitors are known to be used in vehicles. One example of such an implementation is set forth in United States Publication No. 2011/0032096 ("the '096 publication) to Miller et al.

The '096 publication provides an apparatus for performing an alcohol monitor in a vehicle based on a driver being one of a primary driver and a secondary driver. The apparatus comprises an electronic device that is positioned within the vehicle. The electronic device is configured to receive a driver status signal indicating that the driver of the vehicle is the secondary driver. The electronic device is further configured to receive an alcohol content measurement from an alcohol monitoring device (AMD) indicative of a blood alcohol content for the secondary driver. The electronic device is further configured to compare the alcohol content measurement to a predetermined alcohol content.

SUMMARY

An apparatus for detecting an impairment state of a driver in a vehicle is provided. The apparatus comprises a vehicle interface device configured to receive a first audible signal from a driver indicative of at least one word while the driver is in a non-impaired state and to determine a first total time to recite the at least one word based on the first audible signal. The vehicle interface device is further configured to command the driver to recite the at least one word to determine the impairment state of the driver and to receive a second audible signal from the driver indicative of the at least one word. The vehicle interface device is further configured to determine a second total time to recite the at least one word based on the second audible signal and to compare the first total time to the second total time to determine if the driver is in the impaired state.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

Figure 1:
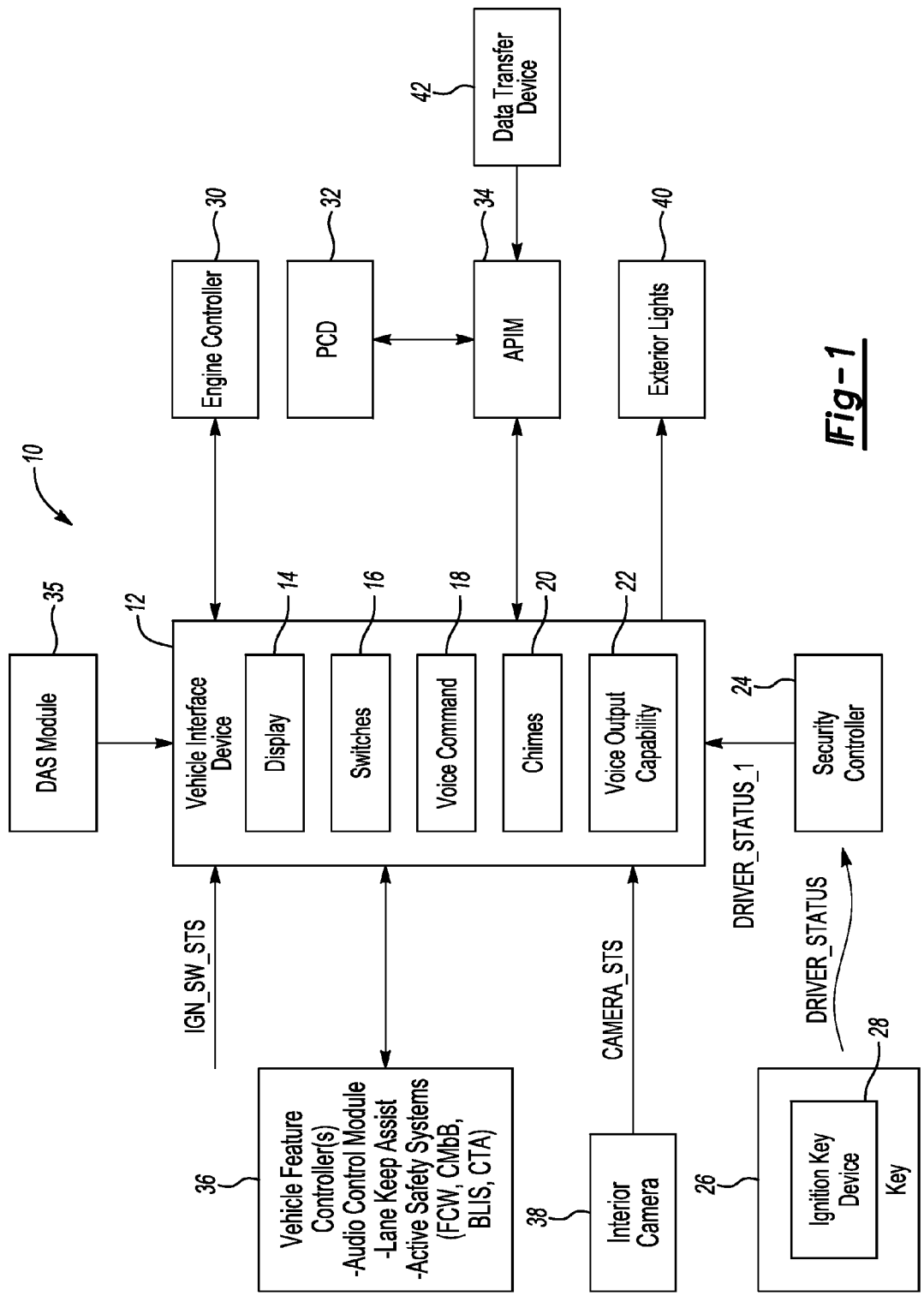
FIG. 1 depicts a system for establishing acoustic phonetic impairment detection test (APIDT) to detect driver impairment in accordance to one embodiment of the present invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Recent studies have shown that alcohol usage is the fifth highest risky behavior to teenage drivers. In 2004, 13% of vehicle fatalities for 16-year-old drivers had a blood alcohol level greater than 0.08%. The numbers increase to 25% for drivers between the ages of 17 and 19 years of age.

Aftermarket breathalyzers are installed into a vehicle by cutting into the preexisting electrical system and splicing wires together as needed. Such a procedure may be expensive, intrusive, and jeopardize the integrity of the vehicle's electrical system. Other aftermarket devices may become available to interrupt starting the vehicle for other reasons, such as, various glucose levels, illegal drugs, etc. Vehicles may not be prepared to integrate these aftermarket devices.

A system is disclosed herein that utilizes an acoustic phonetic impairment test (APIDT) that uses properties of speech performance to detect driver impairment. For example, the system may compare recorded phrases or words (or random combination of words) to established or initially stored phrases or words, respectively, to assess driver impairment. Such impairment may be attributed to factors such as driver alcohol consumption, driver glucose levels, illegal drugs, etc. These factors may change the speech of the driver and such a change may be indicative of the driver being impaired. The system provides an owner, fleet operator, employer, etc. the ability to setup the APIDT and further provides the owner the ability to perform maintenance on the impairment detection implementation, such as adding/removing drivers who are required to undergo the APIDT. In addition, the system may enable the owner the ability to establish dates and times for the APIDT. Upon detecting that the driver is impaired based on a comparison of the recorded phrases or words to the initially stored baseline phrases or words, respectively, the vehicle may, but not limited to, automatically contact an emergency contact (as established by the owner), depict a photo of a family member of the impaired driver, activate various vehicle operations that cannot be disabled, generate warnings to the impaired driver, or simply prevent the vehicle from being started in the event this condition is set up by the owner. The features and others will be discussed in more detail herein.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, RAM, ROM, EPROM, EEPROM, or other suitable variants thereof) and software which co-act with one another to perform operation(s) disclosed herein.

FIG. 1 depicts a system 10 for establishing acoustic metrics to detect driver impairment in accordance to one embodiment of the present invention. The system 10 generally comprises a vehicle interface device ("device") 12. The device 12 includes a display 14 that provides information related to the various states of vehicle functionality or visual warnings to the driver. For example, the display 14 may provide, but not limited to, a driver identification message during vehicle startup, various administrative menu options, a seatbelt warning message, a speed limit start up message, vehicle near top speed message, top speed message, driver identification speed warnings, one or more levels of visual warnings for tailgating and/or an inhibit electronic stability control ("ESC") and forward collision warning (FCW) message, an alert to notify the driver that the vehicle is too close to another vehicle or object, etc. The display 14 may be implemented as a touch screen to enable receipt of commands/data from one or more drivers as will be discussed below in more detail.

The device 12 also includes a plurality of switches 16, a voice recognition command interface 18, chimes 20, and voice output capability 22. The driver may toggle the switches 16 to view different messages and/or select various options. The voice recognition command interface 18 may enable the vehicle to receive commands from the driver so that the driver may audibly input commands and/or responses. One example of a voice recognition command interface is disclosed in U.S. Patent Publication No. 20040143440 ("the '440 publication"), entitled "Vehicle Speech Recognition System," filed Dec. 31, 2003. The voice recognition command interface 18 may receive phrases from a particular driver such that the device 12 compares the same to previously recorded phrases to determine if the driver is impaired. Speech impairment may be indicative of the driver being in an impaired state (e.g., intoxicated, under influence of drugs, abnormal glucose level, etc.).

A primary driver (e.g., owner, employer, fleet owner, etc.) may setup various accounts for particular drivers to enable the driver to input phrases or words which are used for the comparison to detect impairment. These aspects will be discussed in more detail below. The chimes 20 may audibly notify the driver when predetermined vehicle conditions have been met. In one example, the device 12 may activate the chimes 20 when the vehicle is near a top speed, the vehicle has achieved a top speed, the vehicle has exceeded the top speed, there is a low level of fuel in the fuel tank, when the vehicle is detected to be too close to another vehicle or obstacle to prevent a collision, when the traction control is enabled, the driver is detected to be impaired, etc.

In one example, the voice output capability 22 enables the device 12 to transmit audio signals to the driver in the manner, but not limited to, that described in the '440 publication. The switches 16 and the display 14 may function as a touch screen device. The switches 16 may be implemented as alpha-numeric characters. While the display 14, the switches 16, the voice input command interface 18, the chimes 20, and the voice output capability 22 are shown within the device 12, it is contemplated that one or more of these mechanisms may be positioned exterior to the device 12.

A security controller 24 is operably coupled to the device 12. While FIG. 1 generally illustrates that the security controller 24 is positioned outside of the device 12, other implementations may include the security controller 24 being implemented directly within the device 12. In general, one or more of the signals transmitted to/from the device 12 may be transmitted via a data communication bus. The bus may be implemented as a High/Medium Speed Controller Area Network (CAN) bus, a Local Interconnect Network (LIN) bus or other suitable bus generally situated to facilitate data transfer therethrough. The particular type of bus used may be varied to meet the desired criteria of a particular implementation.

An ignition switch (not shown) may receive one or more keys 26. The device 12 may receive a signal IGN_SW_STS from a body controller (not shown) to determine whether the key 26 is operably coupled to the ignition switch and to determine the position of the ignition switch. The keys 26 may be tagged or associated with a primary driver or a secondary driver of the vehicle. As noted above, the primary driver (or administrative driver) may be a parent, employer, or other suitable person who exercises complete control over the vehicle. The secondary driver may be a teenager, a valet, an employee, a technician or other person who must abide by vehicle parameters established by the primary driver. The key 26 includes an ignition key device 28 embedded therein for wirelessly communicating with the vehicle. The ignition key device 28 comprises a transponder (not shown) having an integrated circuit and an antenna. The transponder is adapted to transmit an electronic code as a signal DRIVER_STATUS to a receiver (not shown) in the security controller 24. Data on the signal DRIVER_STATUS may be indicative of which driver (e.g., primary or secondary) is driving the vehicle. The signal DRIVER_STATUS may be in the form of radio frequency (RF) based signal or radio frequency identification (RFID) tag that corresponds to binary data. The security controller 24 determines if additional data in the signal DRIVER_STATUS matches predetermined data stored therein (e.g., in a look up table of the security controller 24) prior to allowing the vehicle to start for anti-theft purposes. A powertrain control module (or engine controller) 30 allows the vehicle to start the engine in the event the data on the signal DRIVER_STATUS matches the predetermined data. It is recognized that the key 26 may also be a personal communication device (PCD) 32, such as a cell phone, in the event such a device 32 is used to gain access into the vehicle. In this example, data transmitted from the PCD 32 may be recognized by the vehicle to indicate whether the driver is the primary driver or the secondary driver.

The security controller 24 may transmit a signal DRIVER_STATUS_1 to indicate whether the particular driver is the primary driver or the secondary driver to various vehicle controllers or modules as either digital data on the data communication bus or hardwired signals. Prior to the security controller 24 transmitting the signal DRIVER_STA- TUS_1, the primary and secondary keys are learned to the security controller 24. An example of the manner in which the keys 26 are learned and programmed to the vehicle as either a primary or a secondary key is set forth in U.S. Pat. No. 7,868,759 ("the '759 patent") to Miller et al. It is recognized that the security controller 24 may be a passive anti-theft controller as set forth in the '759 patent. It is also recognized that security controller 24 as set forth in FIG. 1 may be implemented as a passive-entry-passive start (PEPS) controller as set forth in the '759 patent. In addition, the PCD 32 may be learned to the vehicle in the event predetermined operations are established between the operator of the PCD 32 and the vehicle. The engine controller 30 is operably coupled to the device 12. The device 12 transmits an authorization signal to the engine controller 30 in response to determining that the key 26 is authorized to start the vehicle. The engine controller 30 is configured to provide vehicle speed information to the device 12 on the data bus.

An auxiliary protocol interface module (APIM) 34 may be wirelessly coupled to any number of PCDs 32 via a Bluetooth protocol. The PCD 32 may be a cell phone or other suitable alternative. The APIM 34 is part of an in-vehicle communication system (and includes at least one transmitter (not shown) and at least one receiver (not shown)) which interfaces with each PCD 32 to enable normal operation thereof, voice input control to perform a function with the PCD 32 so that the driver does not have to enter data directly into the PCD 32. The APIM 34 may allow the user to operate a PCD 32 either in a handheld mode (e.g., manual mode) or in a voice control mode (e.g., w/o touch input control). The APIM 34 may interface via switches (not shown) positioned within the vehicle to enable touch selection control to perform a function with the PCD 32 so that the driver does not have to enter data directly into the PCD 32. In one example, the APIM 34 may be implemented as part of the SYNC® system developed by Ford Motor Company® and Microsoft®. Switches may be positioned on the APIM 34, the vehicle's steering wheel (not shown) or on the device 12 to enable touch input. The APIM 34 may further include an embedded PCD (not shown) in the event the driver's PCD 34 is not electrically coupled thereto. The device 12 may transmit data to the APIM 34 to indicate that the driver is detected to be in an impaired state. The APIM 34 may control the PCD 32 to call or text message an emergency contact or alternatively, may utilize the embedded PCD to contact the emergency contact.

The device 12 may also generate a report including recorded events corresponding to moments in which the driver fails to recite a particular phrase or word for purposes of detecting speech impairment, fails to provide the particular phrase or word for purposes of detecting speed impairment within a predetermined time frame, or fails the speech impediment test after providing the recited phrase. The device 12 may transmit data indicative of the report to the APIM 34. The APIM 34 may wirelessly transmit such information to a server for retrieval at a later point.

A driver alert system (DAS) module 35 is operably coupled to the device 12. The DAS module 35 uses a forward pointing camera (not shown) to monitor the vehicle's movement within a lane. The DAS module 35 is configured to detect a shift in the driver's performance that may cause the vehicle to leave a lane or head off of the road. For example, the DAS module 35 measures a driver's alertness and assigns a rating (e.g., Driver Alert Rating (DAR)) by tracking vehicle variation within the lane. In general, the DAS module 35 monitors the DAR to detect a shift in the driver's performance that may be attributed to the driver exhibiting a drowsy or sleepy condition. In the event the DAR is low (or below a pre-defined threshold), the DAS module 35 may transmit a signal to the device 12 for visually and/or audibly notifying the driver that the driver's performance indicates that the driver is in a "drowsy state." The alert is provided to the driver so that the driver can pull himself/herself out of the drowsy state.

A number of vehicle feature controllers 36 are operably coupled to the device 12. Such controllers 36 may control various vehicle features such as an audio system, a lane keep assist system, various safety active systems such as, but not limited to, roll over detection, forward collision, blind spot monitoring, cross traffic alert, etc. In the event the driver is detected to be in an impaired state, the device 12 may transmit a signal to the vehicle feature controllers 36 to active such features in the event the primary driver has enabled the vehicle to operate even if the secondary driver is detected to be in an impaired state. For example, the primary driver may want the vehicle to have some ability to travel to allow the vehicle to operate to prevent the secondary driver from being left alone or stranded, particularly in moments of extreme heat or cold weather. In this case, the vehicle may be configured to enable the vehicle to travel at very low speeds. For example, the device 12 may transmit a reduced maximum speed limit to the engine controller 30 in the event the secondary driver is detected to be impaired. Further, the audio system may be muted or deactivated in the event the secondary driver is detected to be impaired.

An interior camera 38 is also provided to capture an image of a driver while positioned in the vehicle. Exterior lights 40 such as hazard lights are operably coupled to the device. A data transfer device 42 such as a memory stick (e.g., USB memory card, etc.) may be operably coupled to the APIM 34, which then transfers data to the device 12. The relevance of the interior camera 38, the exterior lights 40, and the data transfer device 42 will be explained in more detail below.

FIGS. 2A-2D depict a method 50 for establishing acoustic metrics in the system 10 to detect driver impairment in accordance to one embodiment of the present invention.

In operation 52, the device 12 determines whether the key 26 is operably coupled to an ignition switch (not shown). The device 12 determines such status by monitoring the signal IGN_SW_STS. If the key 26 is in the ignition switch, then the method 50 moves to operation 54. If not, then the method 50 remains to operation 52.

In operation 54, the device 12 determines whether a court ordered APIDT has been imposed for a driver. In one example, the device 12 may monitor for the presence of an aftermarket device that the user is required to install if court ordered. If such an aftermarket device is not connected to the device 12, then a court order is not in place. If the aftermarket device is connected to the device 12, then it can be presumed that a court order is in place. In another example, a diagnostic tool may be operably coupled to the device 12 to enable a bit therein to indicate the presence of a court order. If such a bit is not enabled, then a court order has not been issue. If the court order has been imposed, then the method 50 moves on to method 300 (see FIG. 5A). If not, then the method 50 moves to operation 56.

In operation 56, the device 12 determines whether the ignition switch (when operably coupled to the key 26) is in the RUN position. If so, then the method 50 moves to operation 58. If not, then the method 50 remains in operation 56.

In operation 58, the device 12 determines whether the driver is the primary driver based on the signal DRIVER_STATUS_1. If the driver is the primary driver, then the method 50 moves to operation 60. If not, then the method 50 moves to method 250 (see FIG. 4A).

In operation 60, the device 12 determines whether APIDT has been previously setup for any one or more secondary drivers of the vehicle. In this case, such a determination may be initiated by the primary driver who utilizes the device 12 to perform such an inquiry. If the device 12 determines that the APIDT has been setup, then the method 50 moves to operation 62. If not, then the method 50 moves to operation 66.

In operation 62, the device 12 provides an APIDT menu for display to the primary driver.

In operation 64, the device 12 determines whether the primary driver has selected the APIDT menu to perform an update or revision. If so, the method 50 moves to method 170 (see FIG. 3) to perform various updates. If not, then the method 50 remains in operation 64.

In operation 66, the device 12 prepares the APIDT menu for display to the primary driver.

In operation 68, the device 12 determines whether the primary driver has selected to program an APIDT for a secondary driver via the APIDT menu. If so, the method 50 moves to operation 70. If not, then the method remains in operation 68.

In operation 70, the device 12 provides the APIDT menu to the primary driver. The menu notes that the secondary driver will need to be present along with the primary driver during the setup so that various phrases can be recited by the secondary driver and initially stored onto the device 12.

In operation 72, the device 12 receives the name of the secondary driver from the primary driver.

In operation 74, the device 12 stores/saves the name of the secondary driver as provided in operation 72.

In operation 76, the device 12 provides a listing of phrases (or random combination of words) that is to be recited by the secondary driver. Such phrases (or random combination of words) may be selected by the primary driver or may be established from a predetermined list of phrases as stored therein. It is recognized that any number of phrases (or words) may be selected. In this example, three phrases (or any number of words) will be recited by the secondary driver and stored within the device 12 for purposes of performing the APIDT when the secondary driver attempts to use the vehicle in later moments. Any reference to phrases as noted hereafter also applies to words. For example, instead of using phrases, a user may be expected to provide a single word or random combination of words instead of a phrase. The user may be requested to recite any number of words which do not necessarily form a phrase. It is recognized that any operation as used in connection with a phrase, may also apply to a word.

In operation 78, the device 12 sets a P1 counter to be equal to a predetermined value (e.g., "x"). For example, the x (or P1 counter) may correspond to a number of times a first phrase is to be recorded. By requiring multiple recordings for a first phrase, the device 12 may be configured to learn the particular speech patterns (e.g., the phonemes and/or the rate of time for the secondary driver to recite the first phrase) for the secondary driver when the secondary driver is not impaired (e.g., the secondary driver is in the presence of the primary driver). A phoneme is generally defined as the smallest contrastive unit in a language, or phonetic unit that conveys a distinction in the meaning. Driver impairment may be detected by comparing phonemes in a recited phrase to calculated phonemes for a phrase that is recited when the driver is in a non-impaired state. In addition, driver impairment may be detected by comparing the total amount of time it takes the secondary driver to recite the selected phrase to the calculated total amount of time it takes the secondary driver to recite the phrase when the driver is in a non-impaired state. The total time it takes the user to recite a particular phrase generally includes the various pauses between each word. In some cases, the pauses between each word may be ignored particularly if the phrases are randomly selected from a group of phrases.

In operation 80, the device 12 notifies the secondary driver to select a record button to wait for a prompt such that the secondary driver recites the first phrase (e.g., Phrase n1). In this example, the first phrase may be "The early bird gets the worm."

In operation 82, the device 12 prompts the secondary driver to recite the first phrase in response to receiving an indication that the secondary driver has selected the record button.

In operation 84, the device 12 determines whether the first phrase was received. If so, then the method 50 moves to operation 86. If not, then the method 50 moves to operation 92.

In operation 86, the device 12 stores the received first phrase.

In operation 88, the device 12 decrements the P1 counter.

In operation 90, the device 12 determines whether the P1 counter is equal to zero. If not, then the method 50 moves to operation 92. If so, then the method 50 moves to operation 94.

In operation 92, the device 12 prompts the secondary driver to repeat the first phrase for purposes of collecting another sample. Operations 84, 86, 98, and 90 are repeated until the total number of recorded samples for the first phrase are stored in the device 12.

In operation 94, the device 12 calculates, based on the total number of recorded samples of the first phrase, performance metrics for the first phrase (e.g., phonemes and/or speed (or time) at which phrase is spoken). As noted above, the performance metric may be the total time it takes a user to speak the words in phrase, in addition to the various pauses between each word.

Operations 96, 98, 100, 102, 104, 106, 108, 110, and 112 are generally similar to operations 78, 80, 82, 84, 86, 88, 90, 92, and 94 with the exception being that a second phrase is used in place of the first phrase. Likewise, operations 114, 116, 118, 120, 122, 124, 126, 128, and 130 are generally similar to operations 78, 80, 82, 84, 86, 88, 90, 92, and 94 with the exception being that a third phrase is used in place of the first phrase.

In operation 132, the device 12 enables the primary driver the ability to select specific days and the time of day for the APIDT to be performed for the secondary driver. For example, such days and times may be correspond to moments in which the secondary driver may be apt to engage in driving while intoxicated such as on the weekends or during the evening. Further, the selected time may correspond to after lunch periods, etc. The method 50 proceeds to operation 134 in the event the primary driver selects to set up a particular day or time of day.

In operation 134, the device 12 prompts the primary driver to select a day for the secondary driver to recite a pre-recorded phrase (e.g., the first phrase, the second phrase, and the third phrase as established above).

In operation 136, the device 12 prompts the primary driver to select the time of day for the secondary driver to recite the pre-recorded phrase.

In operation 138, the device 12 enables the primary driver the ability to upload a digital picture (or digital image) that will be displayed to the secondary driver in the event the secondary driver is detected to be impaired. Such a condition may serve to influence the secondary driver to not drive the vehicle while in an impaired state. The digital picture may be that of a family member or a loved one that might encourage the driver to think about the consequences of driving while impaired and to choose an alternative driver or to simply get off of the road. The method 50 proceeds to operation 142 in the event the primary driver elects to have the secondary driver upload a digital picture or someone relevant to him/her.

In operation 140, the device 12 prompts the primary or the secondary driver to couple the data transfer device 42 including the digital picture(s) thereto.

In operation 142, the device 12 determines whether the data transfer device 42 has provided the digital picture. For example, the device 12 may search for a pdf, tiff, jpeg or other file generally associated in providing a digital image. If the data transfer device 42 has not provided the digital picture, then the method 50 moves to operation 144. If so, then the method 50 moves to operation 148.

In operation 144, the device 12 notifies the driver that a digital image has not been detected and gives the driver the option to attempt to try again or to bypass the operation of uploading the digital image.

In operation 146, the device 12 determines whether the driver has made a selection (i.e., attempt to upload or bypass the operation of uploading the digital image). If the driver attempts to upload, then the method 50 moves to operation 140. If not, then the method 50 moves to operation 154.

In operation 148, the device 12 enables the driver to select the picture that is to be uploaded and later used for presentation to the secondary driver in the event the secondary driver is detected to be impaired.

In operation 150, the device 12 determines whether the driver has selected a digital image. If so, then the method 50 moves to operation 152. If not, then the method 50 remains in operation 150.

In operation 152, the device 12 stores or saves the selected digital image.

In operation 154, the device 12 provides the driver with an option for contacting an emergency contact. The device 12 may notify the primary driver that he/she has the option of establishing an emergency contact number in the event the secondary driver is detected to be impaired. If the primary driver selects to establish the contact, then the method 50 moves to operation 156.

In operation 156, the device 12 prompts the primary driver to enter an emergency contact number for the secondary driver.

In operation 158, the device 12 stores the emergency contact number for the secondary driver.

In operation 160, the device 12 enables the primary driver with the option of texting the emergency contact with the emergency contact number or placing a voice call to the emergency contact with the emergency contact number.

In operation 162, the device 12 provides the dates, the time of day, emergency contact number, emergency contact method (e.g., voice or text) and the digital picture on the display 14 to confirm the various selections made by the primary driver.

In operation 164, the device 12 provides a system setup complete screen in the event the primary driver is satisfied with the information provided in operation 162.

Figure 2A:
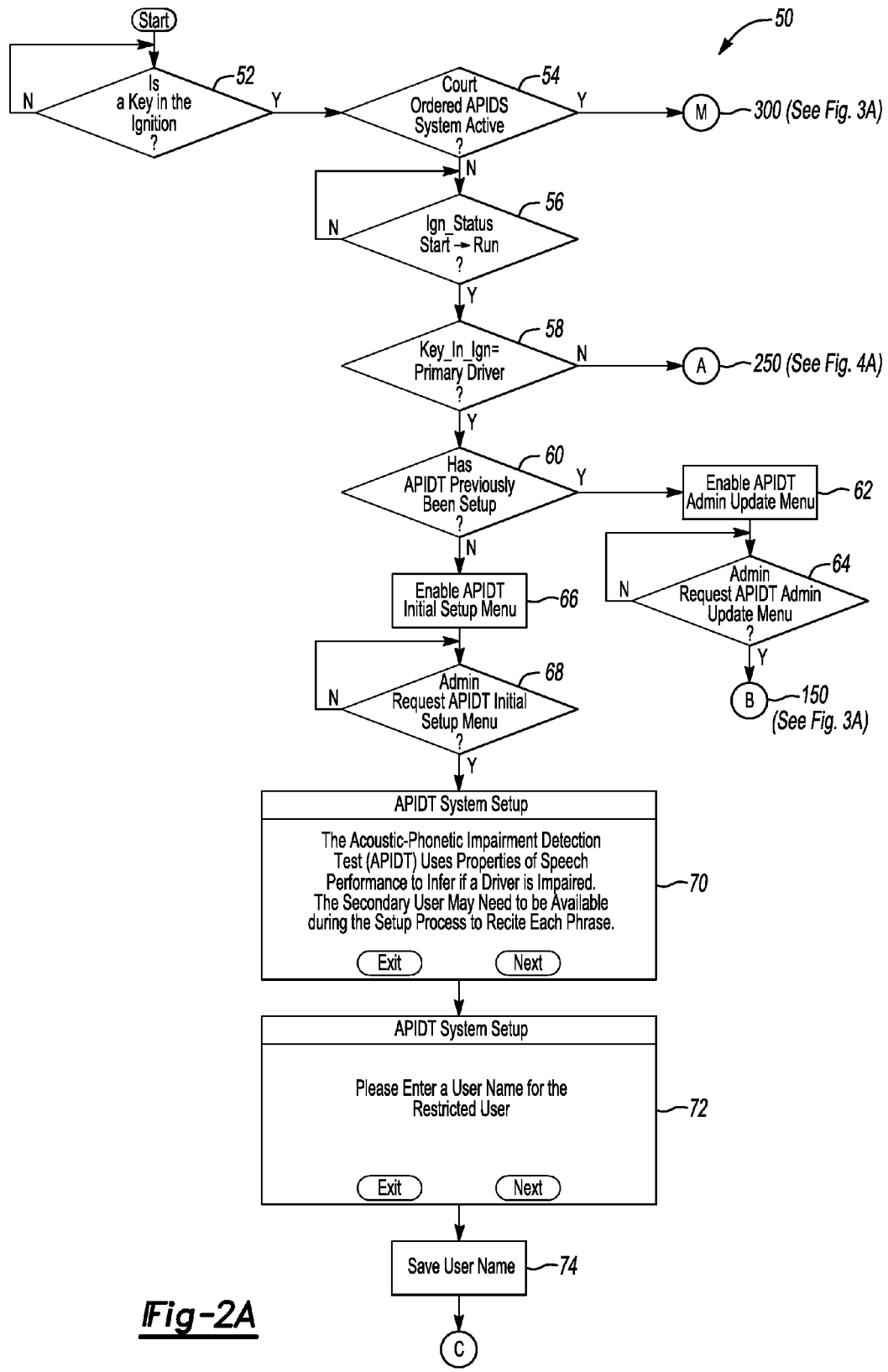
FIGS. 2A-2E depict a method for establishing the APIDT and information related thereto in accordance to one embodiment of the present invention.
Figure 2B:
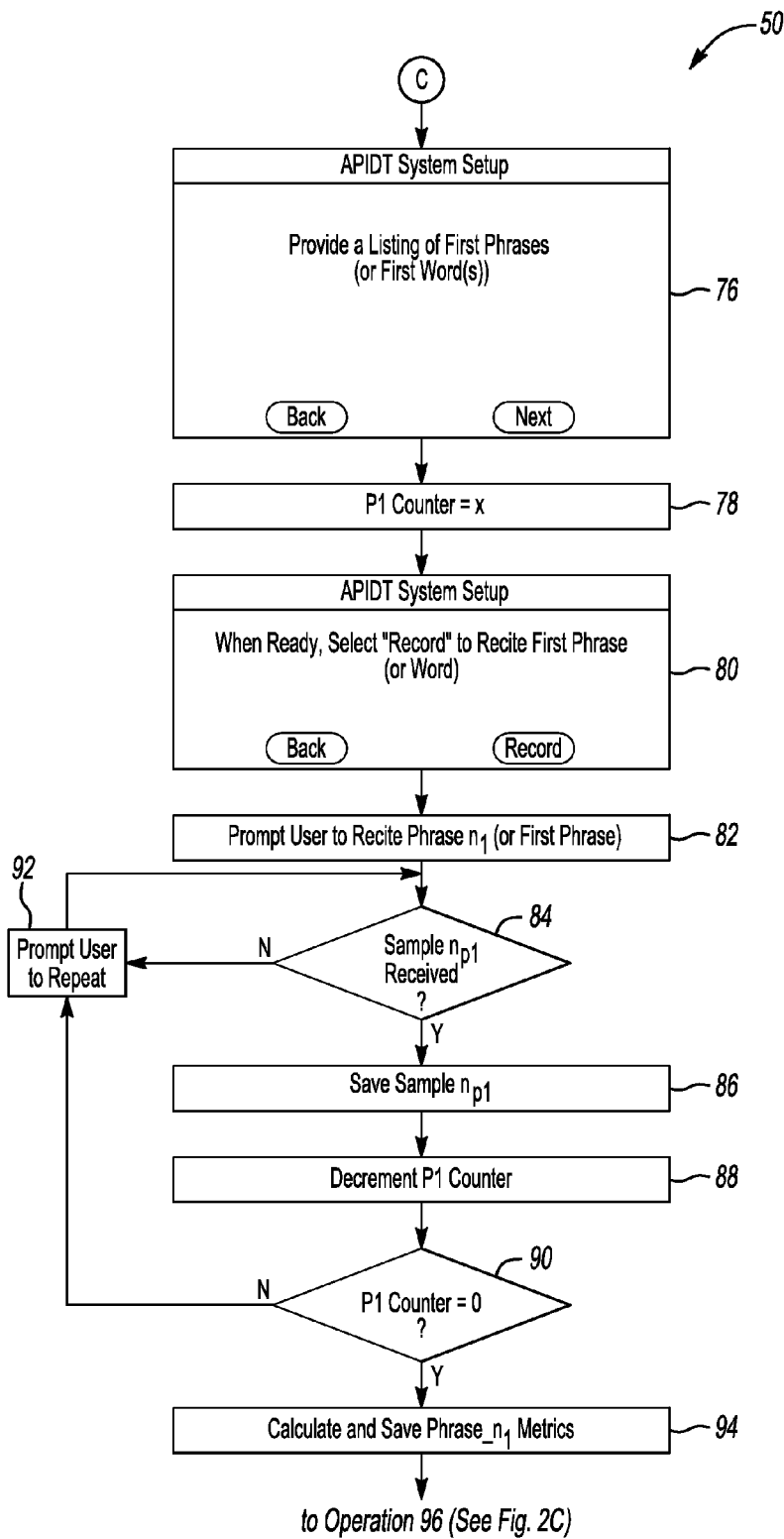
Figure 2C:
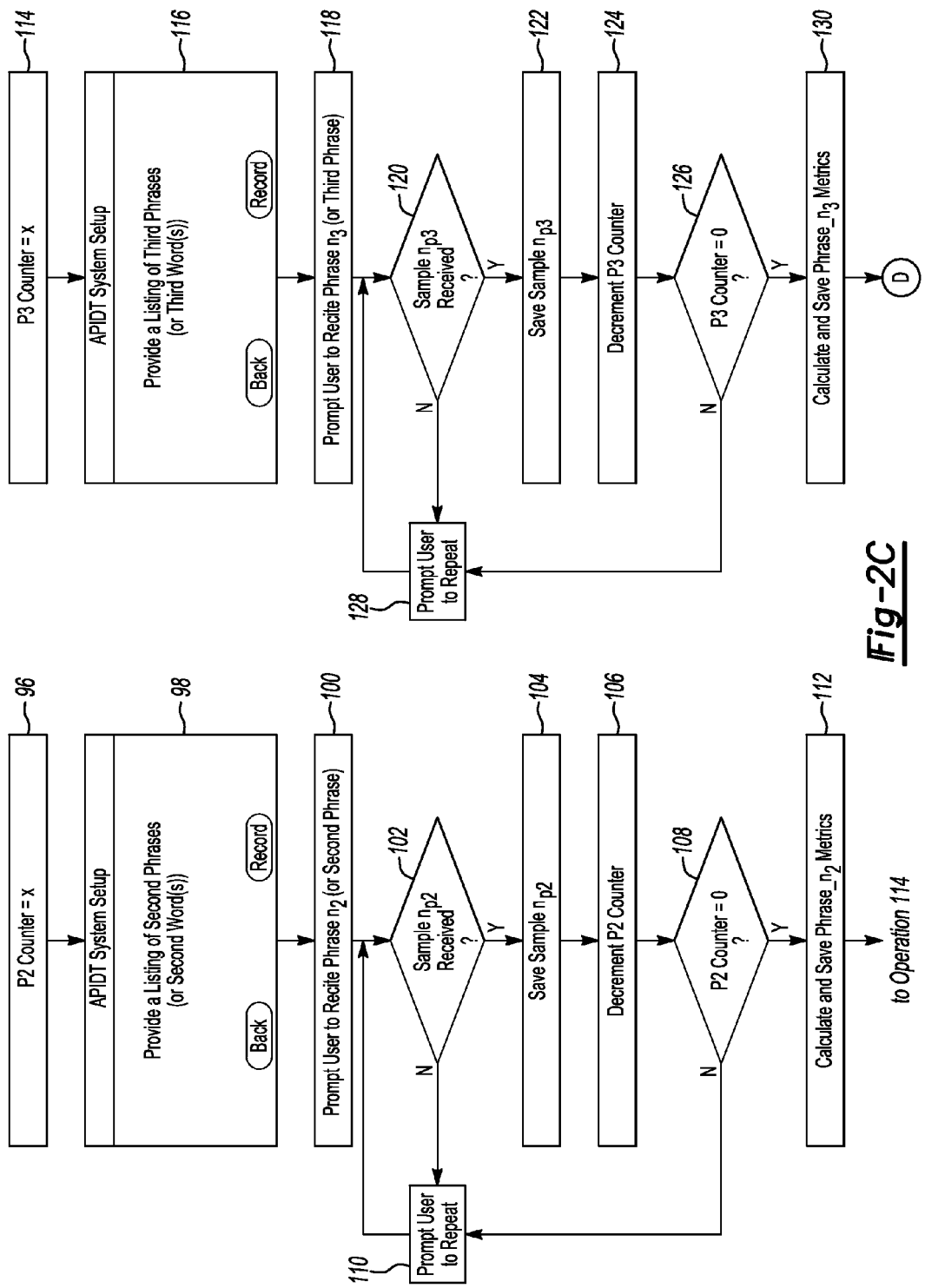
Figure 2D:
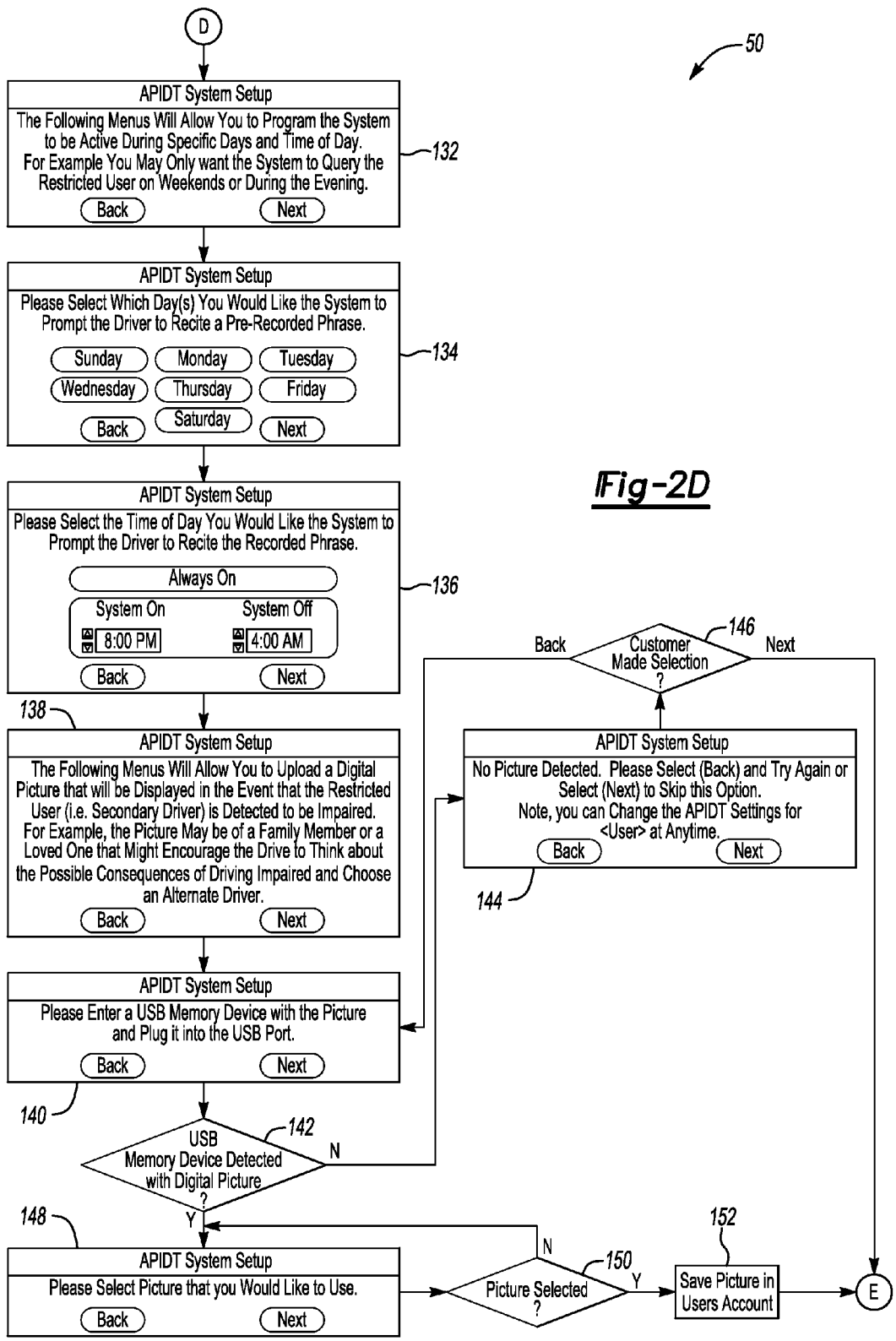
Figure 2E:
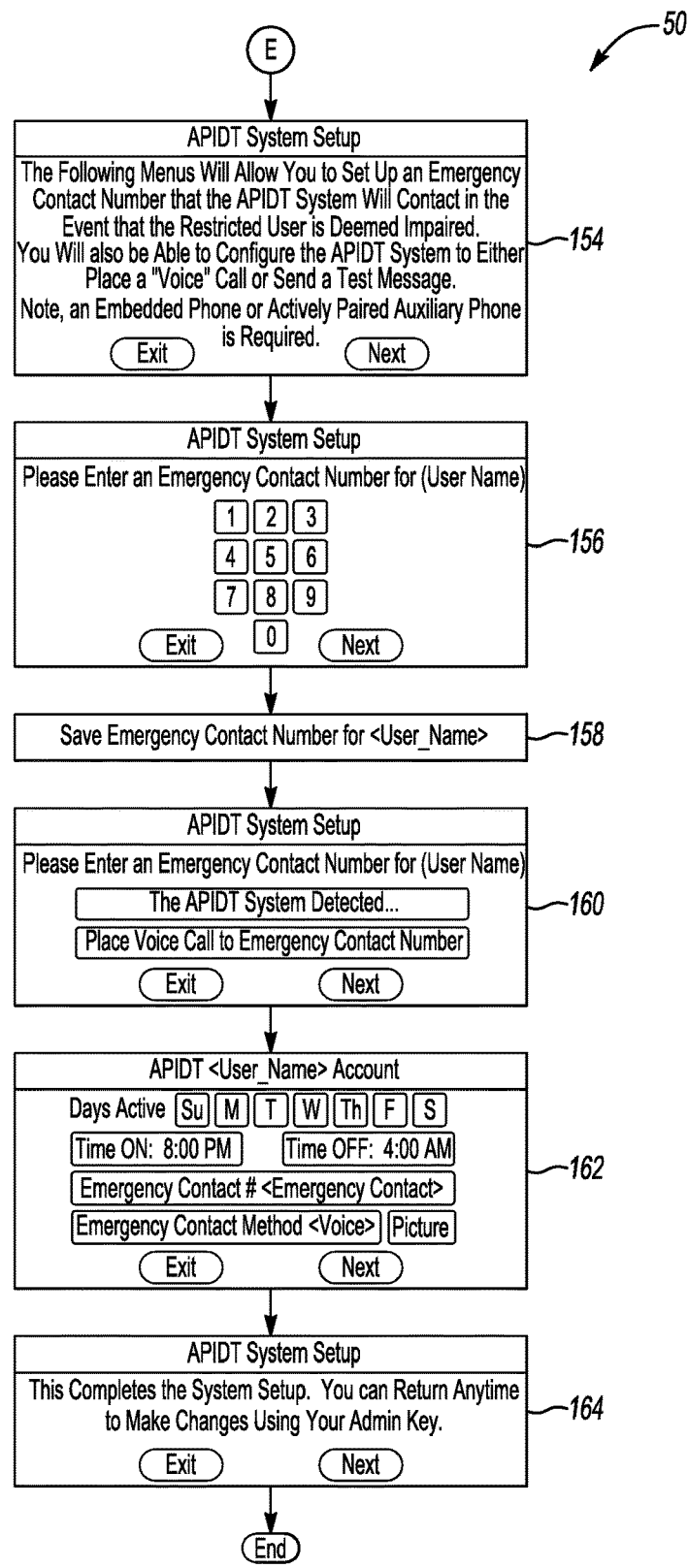
Figure 3:
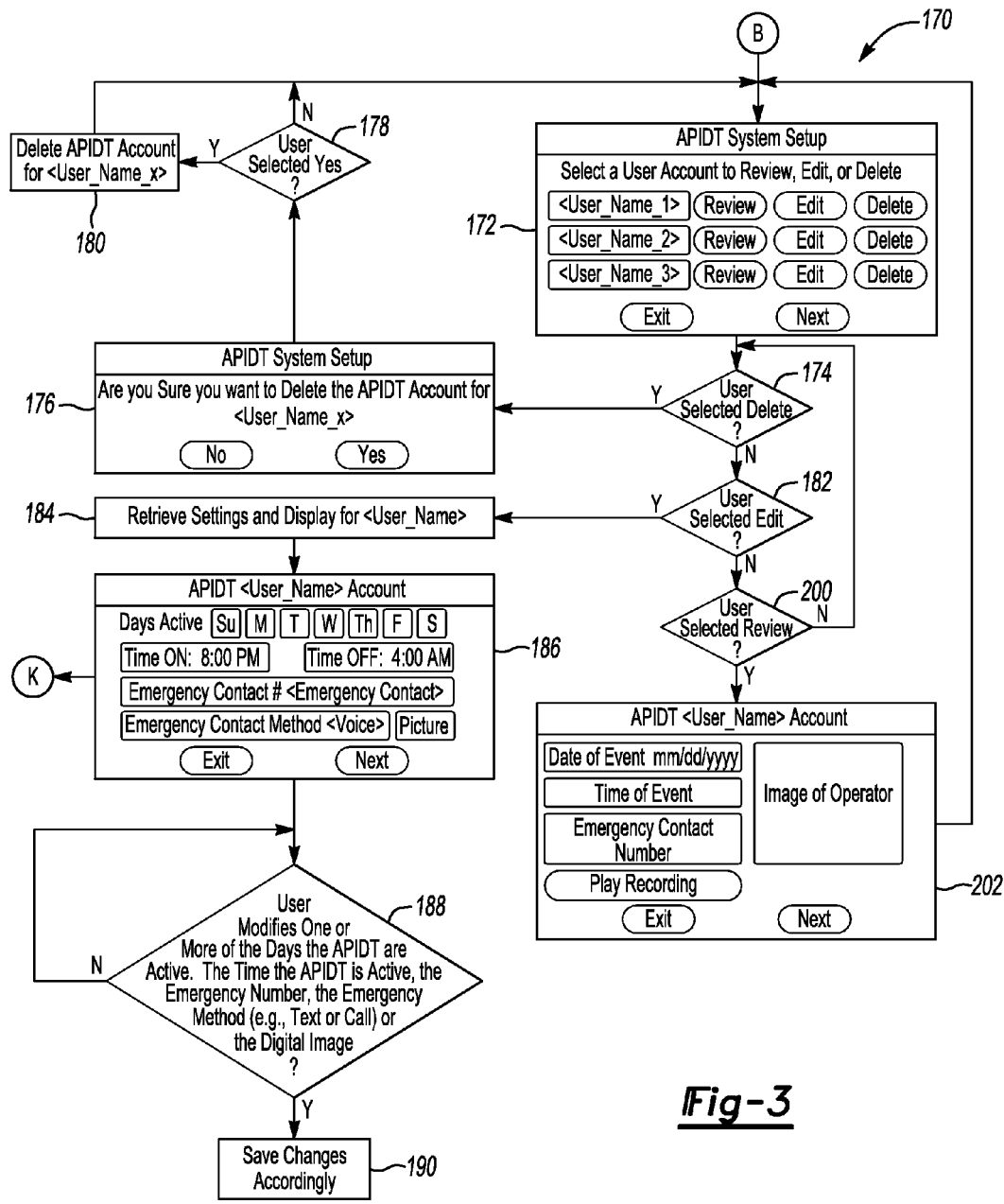
FIG. 3 depicts a method for revising the APIDT information in accordance to one embodiment of the present invention.

FIG. 3 depicts a method 170 for revising the APIDT information as established in FIGS. 2A-2D in accordance to one embodiment of the present invention. For example, the primary driver may add secondary drivers (or additional secondary drivers) for the APIDT, delete secondary drivers from having to undergo the APIDT, or review and modify settings for the APIDT as already established for the secondary drivers.

In operation 172, the device 12 provides various names corresponding to the secondary drivers and further provides the option for the primary driver to review, edit, or delete the same. The device 12 provides this information in response to the primary driver selecting a field in the display 14 to perform various revisions.

In operation 174, the device 12 determines whether the primary driver has elected to delete a particular secondary driver. If so, then the method 170 moves to operation 176. If not, then the method 170 moves to operation 180.

In operation 176, the device 12 prompts the primary driver to confirm that he/she would like to delete the APIDT for the selected secondary driver.

In operation 178, the device 12 determines whether a secondary driver was selected via operations 174 and 176. If so, then the method 170 moves to operation 180. If not, then the method 170 moves back to operation 172.

In operation 200, the device 12 determines whether the primary driver has selected the review option. If so, then the method 170 moves to operation 202. If not, then the method 170 moves back to operation 174.

In operation 182, the device 12 determines whether the primary driver has selected the edit option for modifying various characteristics for a secondary driver. If so, then the method 170 moves to operation 184. If not, then the method 170 moves to operation 200.

In operation 202, the device 12 provides APIDT information for a particular secondary driver. For example, the device 12 provides a display in which the primary driver can review the date in which the APIDT is to be performed, the time in which the APIDT is to be performed, the emergency contact number that is to be contacted either via call or text, the recorded phrases for the secondary driver and the stored digital image for the secondary driver.

In operation 184, the device 12 retrieves setting and displays the same for the selected secondary driver whose characteristics are to be changed.

In operation 186, the device 12 provides the APIDT information such as the day(s) and time of day the APIDT is active in addition to the emergency contact (and contact number), and the digital image, etc. for the primary driver to modify.

In operation 188, the device 12 determines whether the primary driver would like to modify the APIDT information such as the days in which the APIDT is to be performed, the time in which the APIDT is to be performed, the emergency contact and number for the secondary driver, the manner in which the emergency contact is to be contacted (e.g., call or text), or whether a digital image currently loaded therein is to be changed. If the driver modifies one or more of the above, then the method 170 moves to operation 190. If not, then the method 170 remains in operation 188 until the feature times out or until the primary driver elects to exit.

In operation 190, the device 12 modifies the APIDT information in the manner selected in operation 188.

Figure 4A:
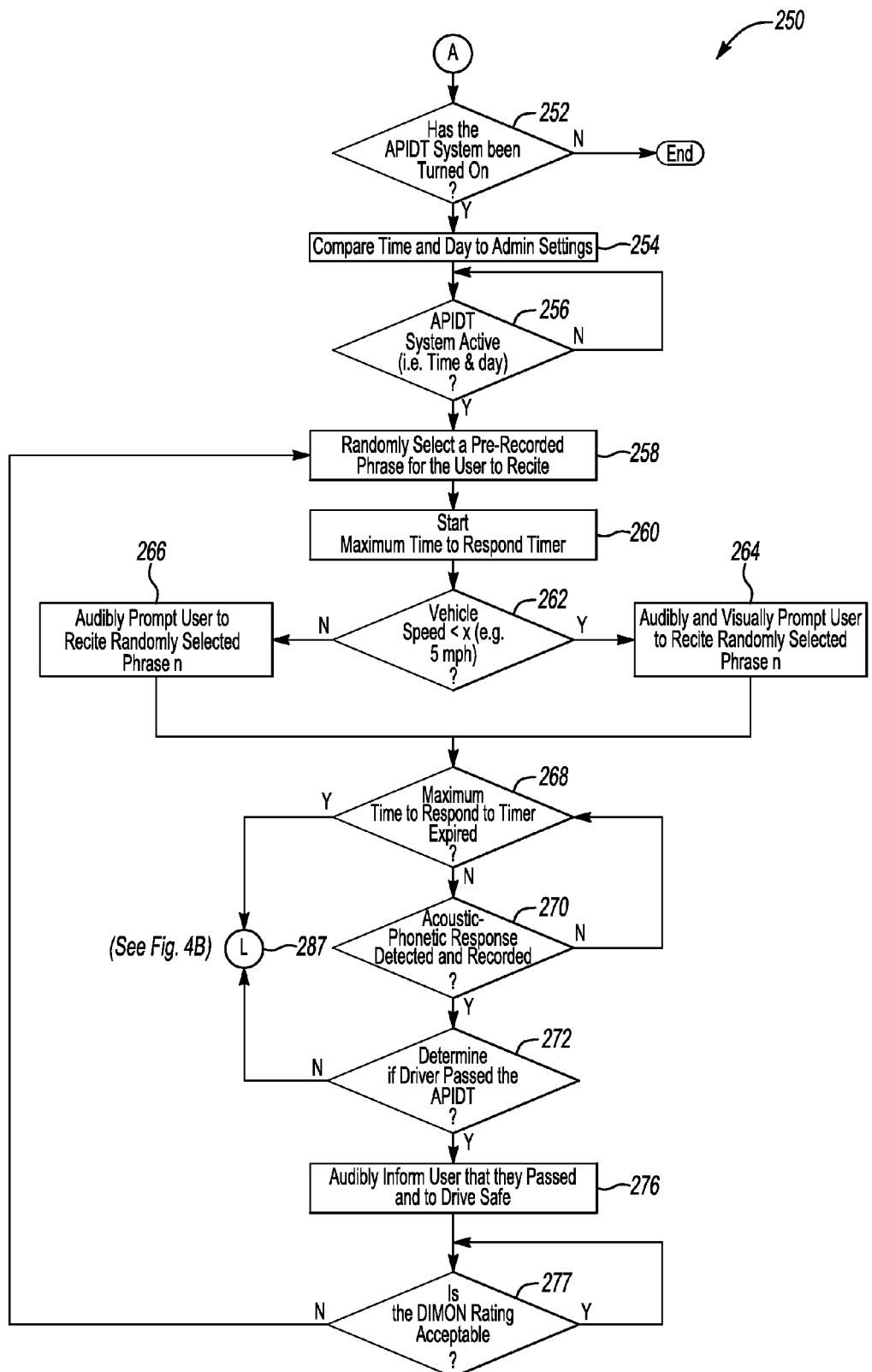
FIGS. 4A-4B depict a method 250 controlling vehicle operations in connection with the APIDT in accordance to one embodiment of the present invention.
Figure 4B:
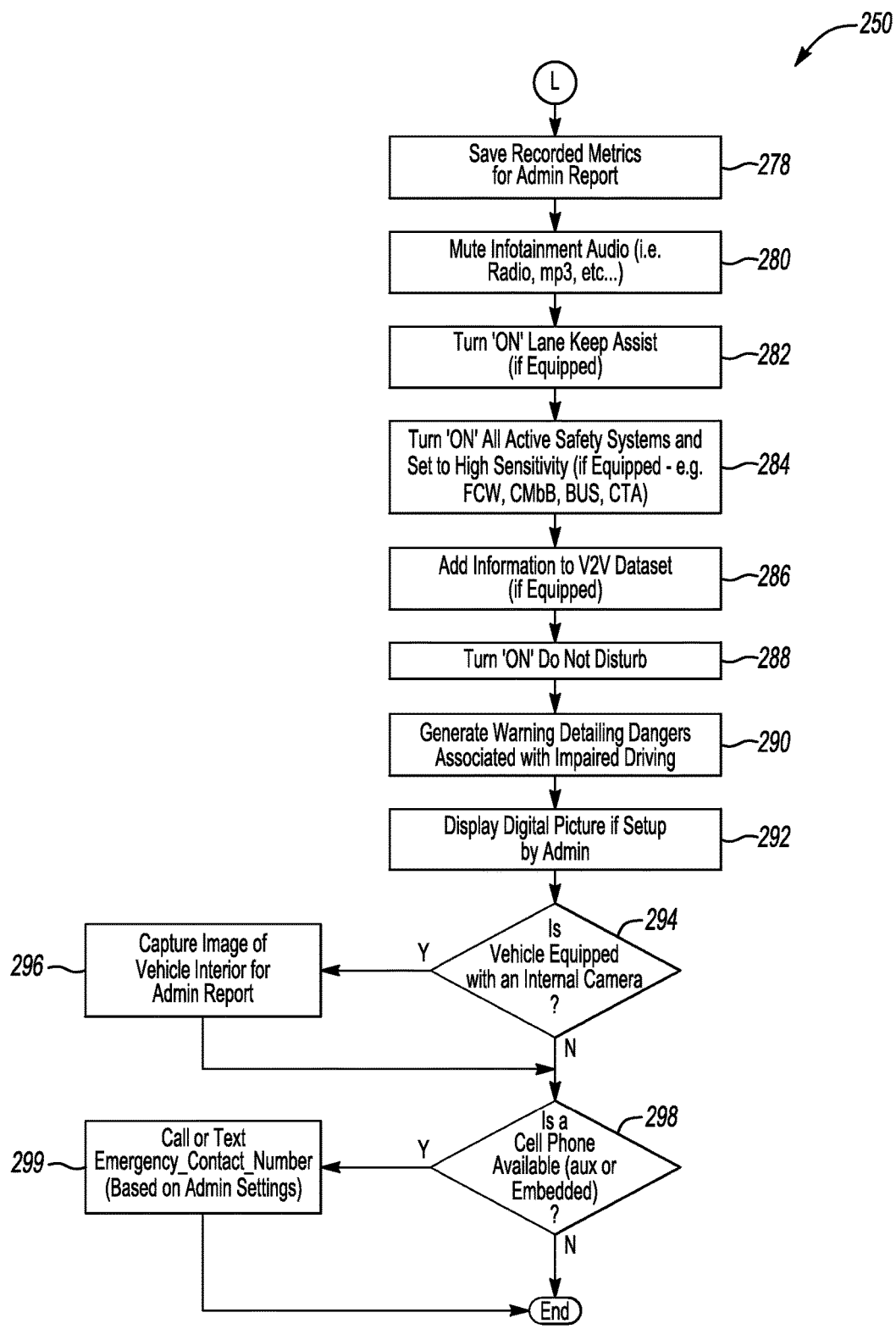

FIGS. 4A-4B depict a method 250 for controlling vehicle operations after performing the APIDT in accordance to one embodiment of the present invention.

In operation 252, the device 12 determines whether the APIDT test has been activated by the primary driver. The device 12 may receive an input to activate/deactivate the APIDT test irrespective of the days and/or the time of day in which the APIDT is to be performed. This feature may serve as a global enable/disable feature for the APIDT function. If the APIDT has been activated, then the method 250 moves to operation 254. If not, then the method 250 ends.

In operation 254, the device 12 compares the current day and the current time of day to the stored day and the stored time of day that was established by the primary driver to initiate the APIDT test. The device 12 receives the current time of day (and the day) from the APIM 34.

In operation 256, the device 12 activates restrictions if the current day and the current time of day fall within the stored day and the stored time of day and the method 250 moves to operation 258. If not, then the method 250 remains in operation 256. In this operation, the secondary driver may start the vehicle and initiate driving the vehicle. However, the secondary driver is still required to perform the APIDT. The primary driver can activate via the device 12, the ability for the secondary driver to start the vehicle and initiate driving. In this case, the primary driver may desire to enable the vehicle to be driven to prevent the condition in which the driver may be stranded during extreme weather conditions. In one example, speed may be significantly limited and all safety and active related features will be enabled in the event any of such safety and active related features is capable of being selectively enabled or disabled. It is also recognized that the primary driver that the primary driver may simply prevent the vehicle from being driven via the selection in the device 12 unless the APIDT is performed. If APIDT is not performed or the driver has failed the test, the vehicle may be able to start to turn on heat/air conditioning, but may not be able to take the vehicle out of the PARK transmission state.

In operation 258, the device 12 randomly selects a phrase for the secondary driver to recite.

In operation 260, the device 12 starts a timer. The secondary driver is required to recite the selected phrase before the timer expires. The use of multiple phrases and the requirement that the secondary driver recite one of the randomly presented phrases may reduce the likelihood of the secondary driver defeating the APIDT. For example, if the secondary driver had a recording of all of the phrases on an external device and attempted to playback the requested phrase via the external device, such a condition may exceed the time limit as the secondary driver would need time to locate the requested phrase on the external device.

In operation 262, the device 12 determines whether the speed of the vehicle is above a predetermined vehicle speed. The device 12 receives the vehicle speed from the engine controller 30. If the speed is above the predetermined vehicle speed, then the method 250 moves to operation 264. If not, then the method 250 moves to operation 266.

In operation 264, the device 12 audibly and/or visually prompts the secondary driver to recite the randomly selected phrase.

In operation 266, the device 12 audibly prompts the secondary driver to recite the randomly selected phrase since the speed is greater than the predetermined vehicle speed.

In operation 268, the device 12 determines whether the secondary driver has recited the randomly selected phrase within a predetermined amount of time. As noted above, the requirement of having the secondary driver recite the selected phrase within the predetermined amount of time may prevent the secondary driver from using an external recording device for reciting the phrase for the secondary driver. If the phrase has been recited by the secondary driver within the predetermined amount of time, then the method 250 moves to operation 287. If not, then the method 250 moves to operation 270.

In operation 270, the device 12 determines whether the secondary driver has provided (or recited) the selected phrase and also whether such received selected phrase has been recorded thereto. If this is the case, then the method 250 moves to operation 272. If not, then the method 250 moves back to operation 268.

In operation 272, the device 12 compares the metrics for the recited phrase (e.g., speed (or time required) at which the secondary driver recites the phrase and/or the phonemes of the recited phrase) against those determined as noted in connection with operation 78 to determine if the secondary driver has passed the APIDT. If this condition is true, then the method 250 moves to operation 276. If not, then the method 250 moves to operation 287. In the event the time required to recite the selected phrase is greater than the time required to recite the phrase as established in FIGS. 2B-2E, such a condition may indicate that the driver is in an impaired state. For example, it is recognized that an impaired driver may utilize more time to recite a particular passage as the cause for impairment (e.g., alcohol consumption) may degrade the fine motor control and timing of various articulates of a person. In the event the time (or speed required) to recite the selected phrase is less than or generally similar to the time to recite the phrase as originally established, then such a condition may indicate that the secondary driver is not impaired. Also, the phonemes used by the driver to recite a particular phrase may also change when such driver is in an impaired state.

In operation 276, the device 12 visually/audibly informs the secondary driver that he/she has passed the APIDT.

In operation 277, the device 12 determines if the DIMON rating as received from the DAS module 35 is acceptable. If not, then the method 250 moves back to operation 258 where the APIDT is performed again. This condition may address the situation in which the driver initially passes the APIDT but while in the vehicle may consume alcohol. If alcohol consumption (or the driver becomes sleepy or tired) occurs and the vehicle exhibits poor DIMON ratings, then the driver is forced to undergo another APIDT. The APIDT may be used as a tool to rouse the driver.

In operation 278, the device 12 records the actual recited phrase that failed the APIDT so that the primary driver can retrieve and listen to the same. The device 12 may generate a report with an indication that the driver failed the APIDT and transmit the same to the APIM 34. The APIM 34 may then transmit the report with the indications to a server (not shown) for retrieval from the primary driver at a later point in time.

In operation 280, the device 12 transmits a signal to the vehicle feature controller 36 (e.g., an audio control module (ACM)) to disable all infotainment related features. For example, the ACM may mute the audio function.

In operation 282, the device 12 transmits a signal to the vehicle feature controller 36 (e.g., a lane keep assist (LKA) module) to activate the lane keep assist feature. The LKA feature ensures applies a supplemental torque to the steering wheel in an effort to assist the driver to keep the vehicle within the line markings of a particular lane.

In operation 284, the device 12 transmits a signal to the vehicle feature controller 36 to enable active safety systems that the vehicle may be equipped with. Such systems may comprise, but not limited to, forward collision warning (FCW), blind spot monitoring, cross traffic alert, Collision Mitigation by Braking (CMbB). CMbB generally precharges brakes in response to detecting an impending collision.

In operation 286, the device 12 adds information indicating that the secondary driver may be in an impaired state to a vehicle to vehicle dataset. In general, V2V shares global positioning system (GPS) data between vehicles. This allows vehicle to determine if they are on a collision path with one another. Another layer of communication involves Vehicle to Infrastructure (V2I), which allows vehicle to determine right of way (e.g., red light, stop sign, etc.). V2V includes a provision that accounts for emergency vehicle status, train, etc. Driver impairment may be relevant to V2V. The impairment state of a driver may be shared with other vehicle, including emergency based vehicle to notify the same that the driver may be in an impaired state.

In operation 288, the device 12 transmits a signal to the APIM 34 to block any calls that relate to non-emergency numbers from being made to/from the PCD 32. In one example, the APIM 34 may transmit a signal to the PCD 32 to disable operation thereof. In another example, the APIM 34 prevents the PCD 32 from being used when the PCD 32 is paired (i.e., electrically mated) to the APIM 34. In the event the PCD 32 is not paired to the APIM 34, the APIM 34 may transmit a signal via a Bluetooth® protocol so that any PCDs 32 detected to be in the vehicle are disabled. In this case, the APIM 34 may transmit the signal via the Bluetooth® protocol to the PCD 32 when the vehicle is detected to be moving. The vehicle is considered to be moving when vehicle speed exceeds a predetermined vehicle speed and/or the transmission status indicates that the vehicle in a non-PARK condition. The engine controller 30 may provide both the vehicle speed and the transmission status. It may not be desirable for the APIM 34 to disable operation of the PCD 32 when the vehicle is not moving as the secondary driver may be attempting to contact someone who can assist them while in the impaired state.

In operation 290, the device 12 generates warnings describing dangers generally associated with impaired driving.

In operation 292, the device 12 displays the digital image of a person who is relevant to the secondary driver (see operation 148 of FIG. 2C). For example, the digital image may be that of a family member or a loved one to the secondary driver that might encourage the driver to think about the consequences of driving while impaired and to choose an alternative driver.

In operation 294, the device 12 determines whether the vehicle is equipped with the interior camera 38. For example, the device 12 may determine whether any inputs are being provided by the interior camera 38 to ascertain if the vehicle is equipped with the interior camera 38. If the vehicle is equipped with the interior camera 38, then the method 250 moves to operation 296. If the vehicle is not equipped with the interior camera 38, then the method 250 moves to operation 298.

In operation 296, the device 12 captures an image of the interior portion of the vehicle and includes such information in the report as generated in operation 278. As noted above, the report may be provided to the primary driver for retrieval/viewing.

In operation 298, the device 12 determines whether the vehicle includes an embedded phone or whether the APIM 34 is operably coupled to a PCD 32. If this condition is true, then the method 250 moves to operation 299. If not, then the method 250 stops.

In operation 299, the device 12 controls the APIM 34 to interface with the PCD 32 such that the vehicle contacts the emergency contact via the emergency contact number as established in connection with operation 158 (see FIG. 2D). If the APIM 34 is not operably couped to the PCD 32, the device 12 may control an embedded phone (not shown) within the vehicle to contact the emergency contact via the contact number.

Figure 5A:
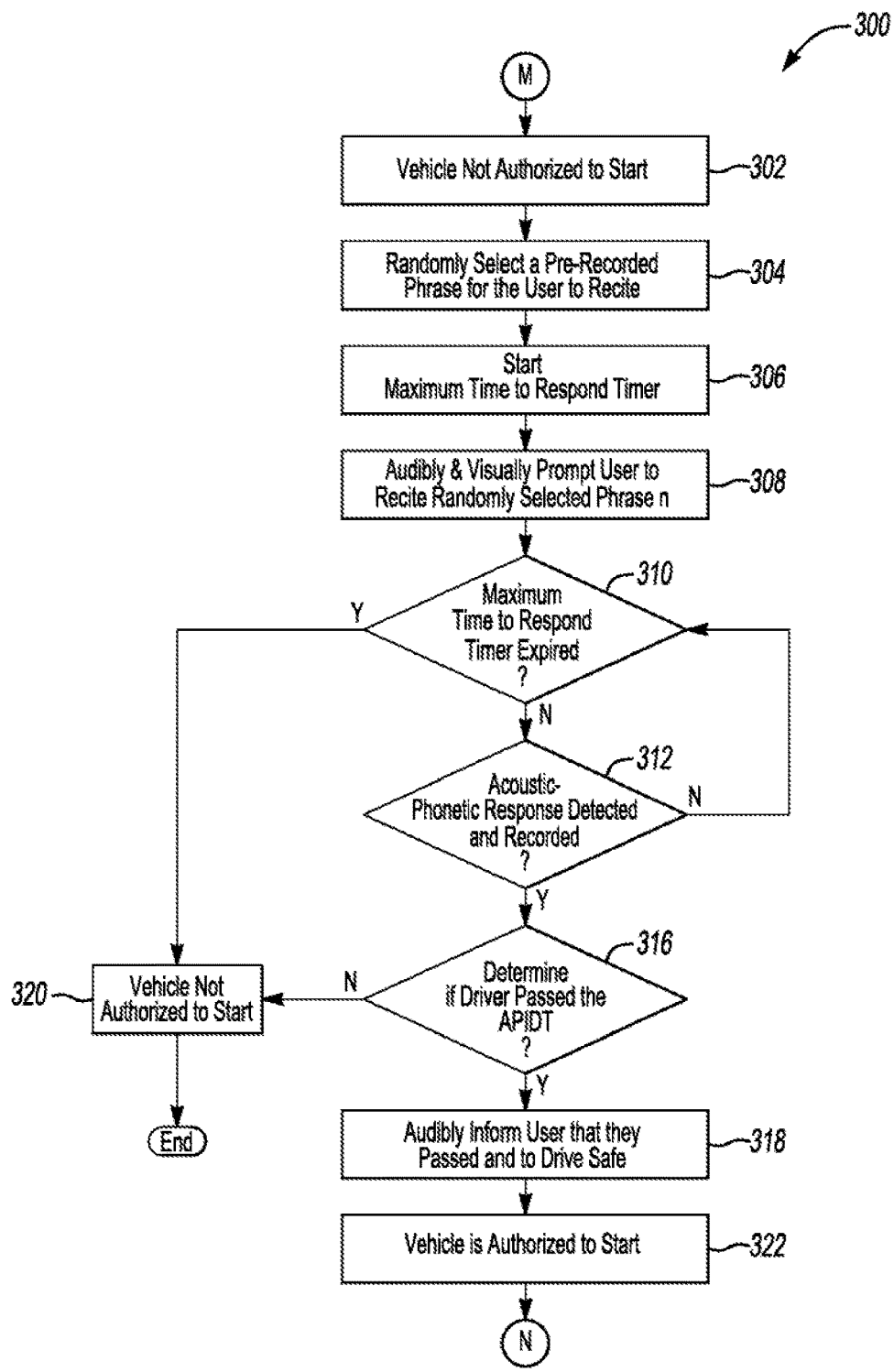
FIGS. 5A-5B depict a method for performing the APIDT for a driver under court order in accordance to one embodiment of the present invention.
Figure 5B:
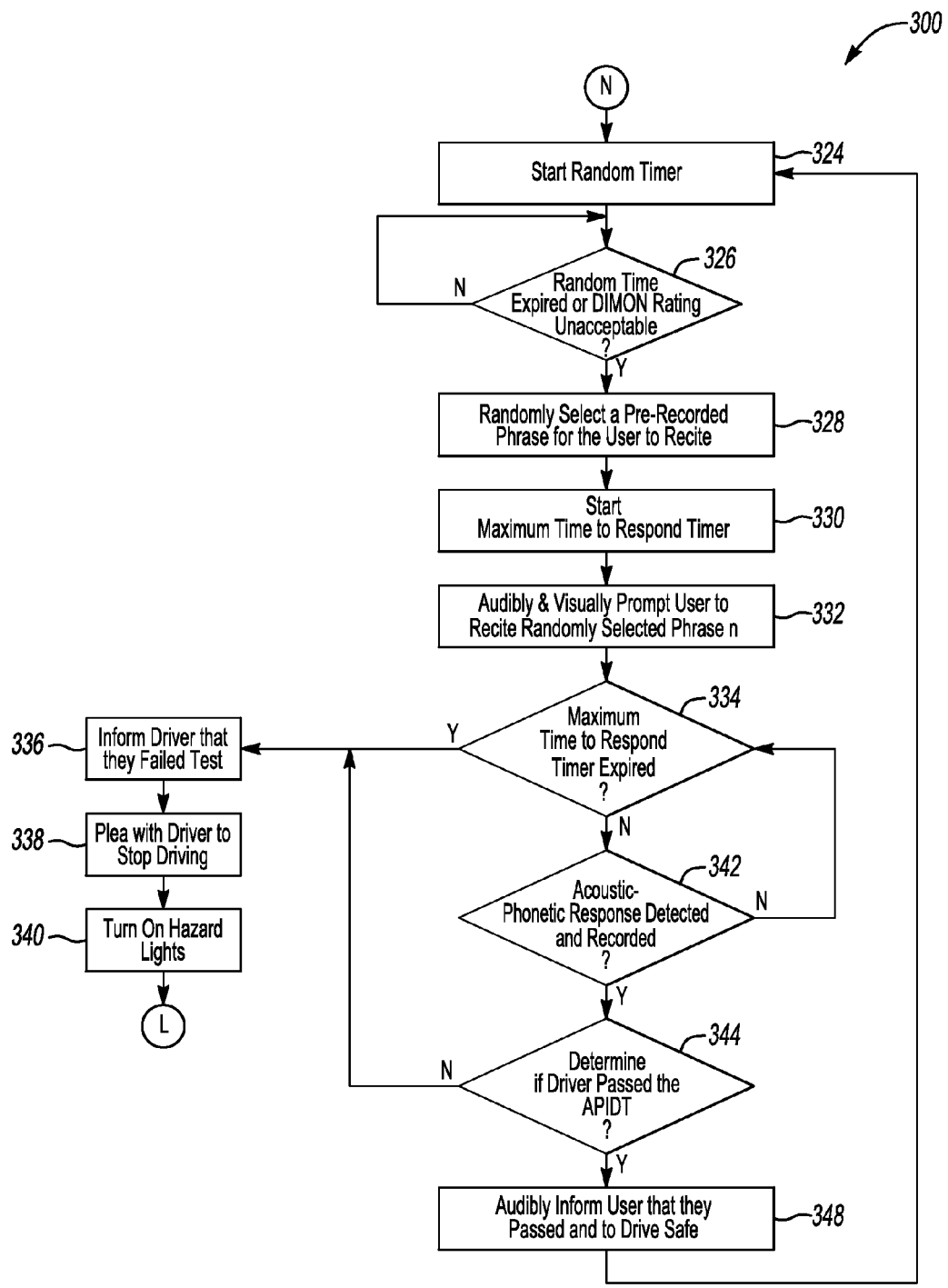

FIGS. 5A-5B depict a method 300 for performing the APIDT for a driver under court order in accordance to one embodiment of the present invention.

In operation 302, the device 12 transmits a control signal to the engine controller 30 to prevent the vehicle from being started.

In operation 304, the device 12 randomly selects the pre-recorded phrase for the secondary driver to recite.

In operation 306, the device 12 starts a timer. The secondary driver is required to recite the selected phrase before the timer expires. As noted above, the use of multiple phrases and the requirement that the secondary driver recite one of the randomly presented phrases may reduce the likelihood of the secondary driver defeating the APIDT. For example, if the secondary driver had a recording of all of the phrases on the external device and attempted to playback the requested phrase, such a condition may exceed the time limit as the secondary driver would need time to locate the requested phrase on the external device.

In operation 308, the device 12 audibly and visually prompts the secondary driver to recite the randomly selected phrase.

In operation 310, the device 12 determines whether the secondary driver has recited the randomly selected phrase within a predetermined amount of time. As noted above, the requirement of having the secondary driver recite the selected phrase may prevent the secondary driver from using an external recording device for reciting the phrase for the secondary driver. If the phrase has been recited by the secondary driver within the predetermined amount of time, then the method 300 moves to operation 312. If not, then the method 300 moves to operation 320.

In operation 320, the device 12 interfaces with the engine controller 30 to prevent the engine from being started.

In operation 312, the device 12 determines if the secondary driver has passed the APIDT (similar to operation 272). If this is the case, then the method 300 moves to operation 314. If not, then the method 300 moves back to operation 310.

The device 12 compares the recited selected phrase (as recorded thereto) to the stored phrase as initially stored by the secondary driver as noted in connection to FIG. 2B.

In operation 316, the device 12 compares the performance metrics of the recited phrase to the standard deviation of performance metrics (similar to operation 274). If the driver passes the APIDT, then the method 300 moves to operation 318. If not, then the method 300 moves to operation 320.

In operation 318, the device 12 visually/audibly informs the secondary driver that he/she has passed the APIDT.

In operation 322, the device 12 interfaces with the engine controller 30 to enable the engine to start.

Operations 324-346 as noted in connection with FIG. 5B are generally performed to periodically monitor the impairment state of the secondary driver after the vehicle has been started.

In operation 324, the device 12 triggers a random timer to determine when the next APIDT will be issued after the vehicle has been started.

In operation 326, the device 12 determines whether the random timer has expired. The time at which the random time expires may be preset by the primary driver via the device 12. In one example, the time may be set to 15 minutes (or other suitable value) and the APIDT may be required to be performed periodically (e.g., 15 minutes) after the initial 15 minute expiration time. This condition may eliminate the potential for the driver to pass the original APIDT test in order to start the vehicle and then subsequently engage in alcohol consumption while the vehicle is started/running By requiring periodic APIDTs after the vehicle has been originally started, such a condition may mitigate the secondary driver's attempt to bypass the APIDT once the vehicle was started.

In operation 328, the device 12 randomly selects the pre-recorded phrase for the secondary driver to recite.

In operation 330, the device 12 starts a timer. The secondary driver is required to recite the selected phrase before the timer expires. As noted above, the use of multiple phrases and the requirement that the secondary driver recite one of the randomly presented phrases may reduce the likelihood of the secondary driver defeating the APIDT. For example, if the secondary driver had a recording of all of the phrases on the external device and attempted to playback the requested phrase, such a condition may exceed the time limit as the secondary driver would need time to locate the requested phrase on the external device.

In operation 332, the device 12 audibly and visually prompts the secondary driver to recite the randomly selected phrase.

In operation 334, the device 12 determines whether the secondary driver has recited the randomly selected phrase within the predetermined amount of time. As noted above, the requirement of having the secondary driver recite the selected phrase may prevent the secondary driver from using an external recording device for reciting the phrase for the secondary driver. If the phrase has been recited by the secondary driver within the predetermined amount of time, then the method 300 moves to operation 342. If not, then the method 300 moves to operation 336.

In operation 336, the device 12 notifies the secondary driver that he/she has failed the APIDT.

In operation 338, the device 12 requests that the secondary driver stop driving the vehicle.

In operation 340, the device 12 transmits a signal to the exterior lights 40 to turn on and blink the hazard lights (or other exterior lighting). The blinking of the exterior lights 40 (or hazards) serve as an indicator to emergency personnel that the driver may be in an impaired state.

In operation 342, the device 12 determines whether the secondary driver has provided (or recited) the selected phrase and also whether such received selected phrase has been recorded thereto. If this is the case, then the method 300 moves to operation 344. If not, then the method 300 moves back to operation 334.

In operation 344, the device 12 determines if the secondary driver has passed the APIDT (similar to operation 272). If the driver passes, then the method 300 moves to operation 348. If not, then the method 300 moves to operation 336.

In operation 348, the device 22 audibly informs the secondary driver that he/she passed the APIDT.

In general, while the above embodiments set forth a system and method for establishing acoustic metrics to detect driver impairment, it is recognized that one or more aspects of the system and method may be implemented in the PCD 32. The PCD 32 may interface with the vehicle to communicate data indicative of the driver being in the impaired state in response to receiving the recited selected phrases. For example, the PCD 32 may have hardware and software for determining baseline acoustic metrics (i.e., the phonemes and/or the time required to recite a phrase) and for comparing calculated acoustic metrics for a recited selected phrase to the baseline acoustic metrics to determine if the driver is in the impaired state.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for detecting an impairment state of a driver in a vehicle, the apparatus comprising:
a vehicle interface device configured to:
receive a first audible signal from a driver indicative of at least one word while the driver is in a non-impaired state;
determine a first total time to recite the at least one word based on the first audible signal;
command the driver to recite the at least one word within a predetermined time frame to determine the impairment state of the driver;
receive a second audible signal from the driver indicative of the at least one word within the predetermined time frame;
determine a second total time to recite the at least one word based on the second audible signal;
compare the first total time to the second total time to determine if the driver is in an impaired state; and
generate an impairment signal indicating that the driver is in the impaired state in response to the driver failing to recite the at least one word within the predetermined time frame.

2. The apparatus of claim 1 wherein the vehicle interface device is further configured to determine that the driver is in the impaired state if the second total time is greater than the first total time.

3. The apparatus of claim 1 wherein the vehicle interface device is configured to randomly select the at least one word from a plurality of words after determining the first total time.

4. The apparatus of claim 1 wherein the vehicle interface device is further configured to receive a first command signal from an administrative driver such that the vehicle is one of (i) disabled in the event the driver is detected to be in the impaired state and (ii) partially disabled in the event the driver is detected to be in the impaired state.

5. The apparatus of claim 4 wherein the first command signal indicates that the vehicle is partially disabled, the impairment signal being used to at least one of (i) provide an indication that the driver failed to recite the at least one word within the predetermined time frame, (ii) disable an audio control system, (iii) activate safety related features, (iv) filter any non-emergency calls, (v) provide an indication to the driver related to safety issues while driving impaired, and (vi) display an image of a person of interest to the driver.

6. The apparatus of claim 4 wherein the first command signal indicates that the vehicle is partially disabled, the impairment signal being used to at least one of (i) provide an indication on a report that the driver is in the impaired state, (ii) disable an audio control system, (iii) activate safety related features, (iv) filter any non-emergency calls, (v) provide an indication to the driver related to safety issues while driving impaired, and (vi) display an image of a person of interest to the driver.

7. The apparatus of claim 1 wherein the vehicle interface device is further configured to determine that the driver is not in the impaired state if the first total time is greater than or equal to the second total time.

8. The apparatus of claim 7 wherein the vehicle interface device is further configured to determine if the vehicle is deviating from a lane in a road and to command the driver to recite at least another word to determine if the driver is in the impaired state in response to determining that the vehicle is deviating from the lane.

9. A method for detecting an impairment state of a driver in a vehicle, the method comprising:
electronically receiving a first audible signal from a driver indicative of at least one word while the driver is in a non-impaired state;
determining, at a vehicle interface device, a first total time to recite the at least one word based on the first audible signal;
electronically commanding the driver to recite the at least one word within a predetermined time frame to determine the impairment state of the driver;
receiving a second audible signal from the driver indicative of the at least one word within the predetermined time frame;
determining, at the vehicle interface device, a second total time to recite the at least one word based on the second audible signal
comparing the first total time to the second total time to determine if the driver is in an impaired state; and
generating an impairment signal indicating that the driver is in the impaired state in response to the driver failing to recite the at least one word within the predetermined time frame.

10. The method of claim 9 further comprising determining that the driver is in the impaired state if the second total time is greater than the first total time.

11. The method of claim 9 further comprising randomly selecting the at least one word from a plurality of words after determining the first total time.

12. The method of claim 9 further comprising receiving a first command signal from an administrative driver such that the vehicle is one of (i) disabled in the event the driver is detected to be in the impaired state and (ii) partially disabled in the event the driver is detected to be in the impaired state.

13. The method of claim 12 wherein first command signal indicates that the vehicle is partially disabled, the impairment signal being used to at least one of (i) provide an indication that the driver failed to recite the at least one word within the predetermined time frame, (ii) disable an audio control system, (iii) activate safety related features, (iv) filter any non-emergency calls, (v) provide an indication to the driver related to safety issues while driving impaired, and (vi) display an image of a person of interest to the driver.

14. The method of claim 12 wherein the impairment signal is used to at least one of (i) provide an indication on a report that the driver is in the impaired state, (ii) disable an audio control system, (iii) activate safety related features, (iv) filter any non-emergency calls, (v) provide an indication to the driver related to safety issues while driving impaired, and (vi) display an image of a person of interest to the driver.

15. The method of claim 9 further comprising determining that the driver is not in the impaired state if the first total time is greater than or equal to the second total time.

16. The method of claim 15 further comprising:
determining if the vehicle is deviating from a lane in a road; and
commanding the driver to recite at least another word to determine if the driver is in the impaired state in response to determining that the vehicle is deviating from the lane.

17. An apparatus comprising:
a vehicle interface device configured to:
receive a first audible signal from a driver indicative of a phrase while in a non-impaired state;
command the driver to provide a second audible signal indicative of the phrase within a predetermined time to determine an impairment state for the driver; and
determine that the driver is in an impaired state in response to the second audible signal not being received within the predetermined time.

18. The apparatus of claim 17 wherein the vehicle interface device is further configured to determine a first time to recite the phrase based on the first audible signal.

19. The apparatus of claim 18 wherein the vehicle interface device is further configured to determine a second time to recite the phrase based on the second audible signal.

20. The apparatus of claim 19 wherein the vehicle interface device is further configured to determine that the driver is in the impaired state if the second time is greater than the first time.

* * * * *